United States Patent [19]
Lee

[11] Patent Number: 6,057,526
[45] Date of Patent: May 2, 2000

[54] WIRE FEED UNIT SYSTEM TO AUTOMATICALLY FEED FILLER WIRE TO A WELD

[76] Inventor: Gerald Clyde Lee, 845 Watson SW., Grand Rapids, Mich. 49504

[21] Appl. No.: 09/138,275

[22] Filed: Aug. 21, 1998

[51] Int. Cl.[7] ...................................................... B23K 9/00
[52] U.S. Cl. .................. 219/145.1; 219/136; 219/137.7; 219/137.2; 219/134; 228/45; 228/102; 228/8
[58] Field of Search ................................ 219/145.1, 136, 219/137.7, 137.2, 134; 228/45, 102, 8

[56] References Cited

U.S. PATENT DOCUMENTS

| | | | |
|---|---|---|---|
| 3,743,812 | 7/1973 | Peyrot | 219/60 A |
| 4,160,151 | 7/1979 | Tonita | 219/137.8 |
| 4,179,056 | 12/1979 | Schmerling | 226/171 |
| 4,206,862 | 6/1980 | DaCosta | 226/178 |
| 5,410,126 | 4/1995 | Miller et al. | 219/130.1 |
| 5,500,512 | 3/1996 | Goldblatt | 235/375 |

*Primary Examiner*—Patrick Ryan
*Assistant Examiner*—M. Alexandra Elve

[57] ABSTRACT

A wire feed unit system including a base having a lower support surface positionable upon a recipient surface and an upper support surface. A housing is located on the upper support surface with a door mounted on one side face thereof supported by a hinge to allow access to an interior chamber therein. A plurality of wire feed wheels in rotatable driving contact with each other and an associated motor for effecting the rotation of one of the wheels with the filler wire therebetween to thereby feed the filler wire from the pulley to exterior of the housing. A whip hold down tube extends through the housing at the downstream end thereof with an intermediate tubular wire guide between the wheels and the whip hold down. A flexible cylindrical line extends from the whip hold down to the area to be welded with a cylindrical whip body at the end of the line.

1 Claim, 2 Drawing Sheets

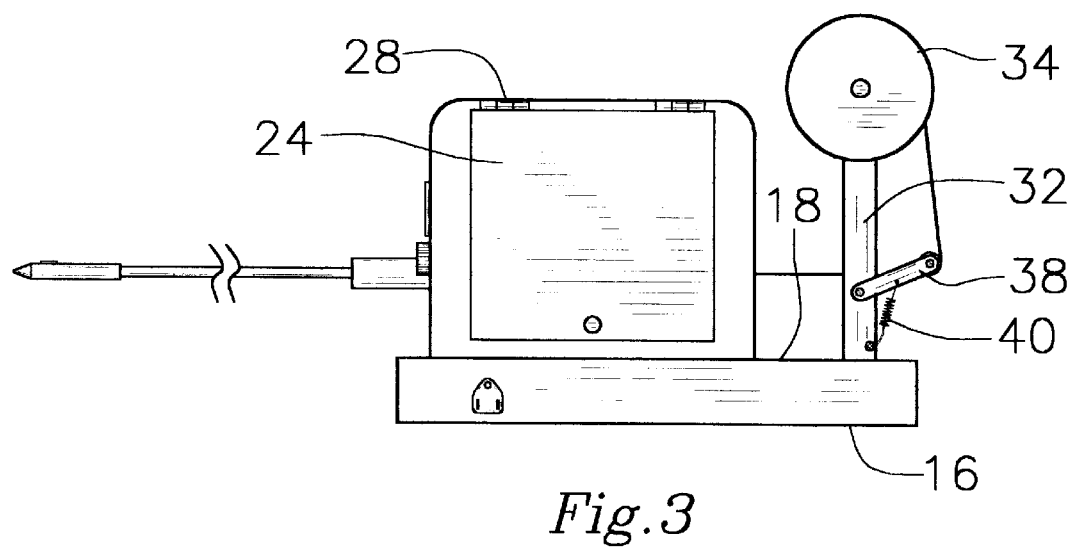
Fig.3
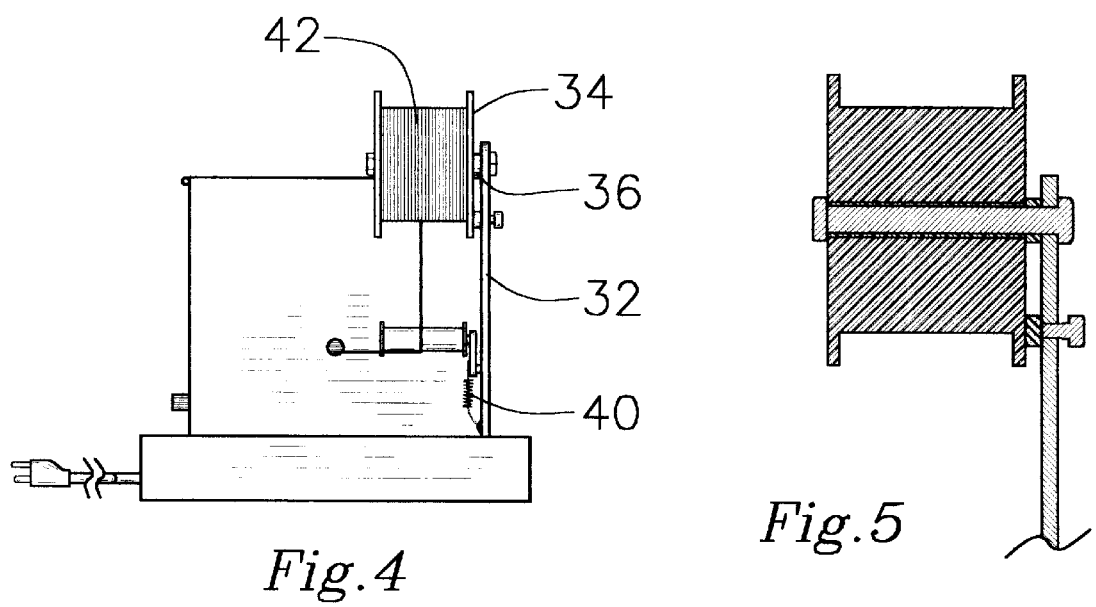
Fig.4
Fig.5
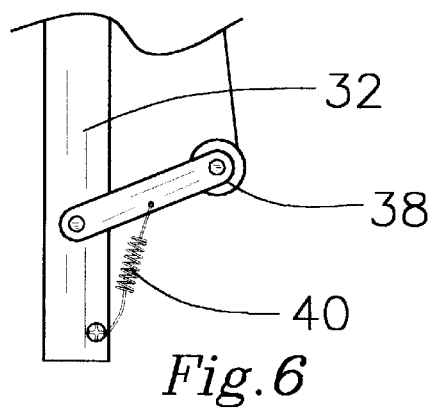
Fig.6

WIRE FEED UNIT SYSTEM TO AUTOMATICALLY FEED FILLER WIRE TO A WELD

BACKGROUND OF THE INVENTION

1. Field of the Invention

The present invention relates to a new and improved wire feed unit system to automatically feed filler wire to a weld, and more particularly, pertains to a wire feed unit system.

2. Description of the Prior Art

The use of wire feeding systems of known designs and configurations is known in the prior art. More specifically, wire feeding systems of known designs and configurations heretofore devised and utilized for the purpose of to automatically feed filler wire through a wall are known to consist basically of familiar, expected, and obvious structural configurations, notwithstanding the myriad of designs encompassed by the crowded prior art which has been developed for the fulfillment of countless objectives and requirements.

The prior art discloses a large number of wire feeding systems of known designs and configurations. By way of example, U.S. Patent Number (enter) to (enter) discloses a (enter).

U.S. Pat. No. 5,410,126 to Miller et al. discloses a Portable AC/DC Wire Feed Welder.

U.S. Pat. No. 4,379,941 to Partel discloses an Electromagnetic Feed Device For Variable Forward Motion of Solder Wire or Welding Wire in a Soldering Iron or Welding Gun.

U.S. Pat. No. 5,302,805 to Morris et al. discloses a Welding Wire Pressure Sensor Assembly.

U.S. Pat. No. 5,349,958 to Okazaki et al. discloses a Method and Apparatus for Wire Feeding in a Wire-Cut Electroerosion Apparatus.

U.S. Pat. No. Des. 346,390 to Sperling et al. discloses a Welding Torch.

Lastly, U.S. Pat. No. 5,326,958 to Gens discloses a Drive Device for Push-Pull Welding Torches.

In this respect, the wire feed unit system to automatically feed fuller wire to a weld according to the present invention substantially departs from the conventional concepts and designs of the prior art, and in doing so provides an apparatus primarily developed for the purpose of wire feed unit system.

Therefore, it can be appreciated that there exists a continuing need for a new and improved wire feed unit system to automatically feed fuller wire to a weld which can be used for wire feed unit system. In this regard, the present invention substantially fulfills this need.

SUMMARY OF THE INVENTION

In view of the foregoing disadvantages inherent in the known types of wire feeding systems of known designs and configurations now present in the prior art, the present invention provides a new and improved wire feed unit system to automatically feed fuller wire to a weld. As such, the general purpose of the present invention, which will be described subsequently in greater detail, is to provide a new and improved wire feed unit system to automatically feed fuller wire to a weld and methods which have all the advantages of the prior art and none of the disadvantages.

To attain this, the present invention essentially comprises a new and improved wire feed unit system to automatically feed filler wire to a weld comprises including a base in a generally rectilinear configuration having a lower support surface positionable upon a recipient surface and an upper support surface. Also provided is a housing formed in a generally rectilinear configuration located on the upper support surface with a door mounted on one side face thereof supported by a hinge to allow access to an interior chamber therein. Additionally provided is a spool supporting rod positioned on the upper support surface upstream from the housing with a spool rotatably supported thereon. The support rod has a pivotally mounted arm with a pulley at its outboard end and a tension spring urging the arm and pulley downwardly with filler wire mounted on the spool for movement around the pulley through the housing. A pair of wire feed wheels are provided in rotatable driving contact with each other and an associated motor for effecting the rotation of one of the wheels with the filler wire therebetween to thereby feed the filler wire from the pulley to exterior of the housing. A whip hold down tube extends through the housing at the downstream end thereof with an intermediate tubular wire guide between the wheels and the whip hold down. A flexible cylindrical line extends from the whip hold down to the area to be welded with a cylindrical whip body at the end of the line. The whip body has a cone-shaped tip at its end remote from the housing for positioning at the weld. Controls include an off/on switch with an indicator light for actuating the motor to feed the filler wire and an associated feed dial to vary the wire speed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wire feed unit system to automatically feed fuller wire to a weld which has all the advantages of the prior art wire feeding systems of known designs and configurations and none of the disadvantages.

It is another object of the present invention to provide a new and improved wire feed unit system to automatically feed fuller wire to a weld which may be easily and efficiently manufactured and marketed.

It is a further object of the present invention to provide a new and improved wire feed unit system to automatically feed fuller wire to a weld which is of a durable and reliable construction.

An even further object of the present invention is to provide a new and improved wire feed unit system to automatically feed fuller wire to a weld which is susceptible of a low cost of manufacture with regard to both materials and labor, and which accordingly is then susceptible of low prices of sale to the consuming public, thereby making such a wire feed unit system to automatically feed fuller wire to a weld economically available to the buying public.

Even still another object of the present invention is to wire feed unit system.

Lastly, it is an object of the present invention to provide a wire feed unit system including a base having a lower support surface positionable upon a recipient surface and an upper support surface. A housing is located on the upper support surface with a door mounted on one side face thereof supported by a hinge to allow access to an interior chamber therein. A plurality of wire feed wheels in rotatable driving contact with each other and an associated motor for effecting the rotation of one of the wheels with the filler wire therebetween to thereby feed the filler wire from the pulley to exterior of the housing. A whip hold down tube extends through the housing at the downstream end thereof with an intermediate tubular wire guide between the wheels and the whip hold down. A flexible cylindrical line extends from the whip hold down to the area to be welded with a cylindrical whip body at the end of the line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 a side elevational view of the system shown in FIGS. 1 and 2.

FIG. 4 a rear elevational view of the systems shown in the prior Figures.

FIG. 5 is an enlarged cross-sectional view through the spool and spool bearing.

FIG. 6 is an enlarged side-elevational view of the spool support rod, wire pulley and tension spring shown in FIG. 3.

The same reference numerals refer to the same parts throughout the various Figures.

DESCRIPTION OF THE PREFERRED EMBODIMENT

Figure 1:
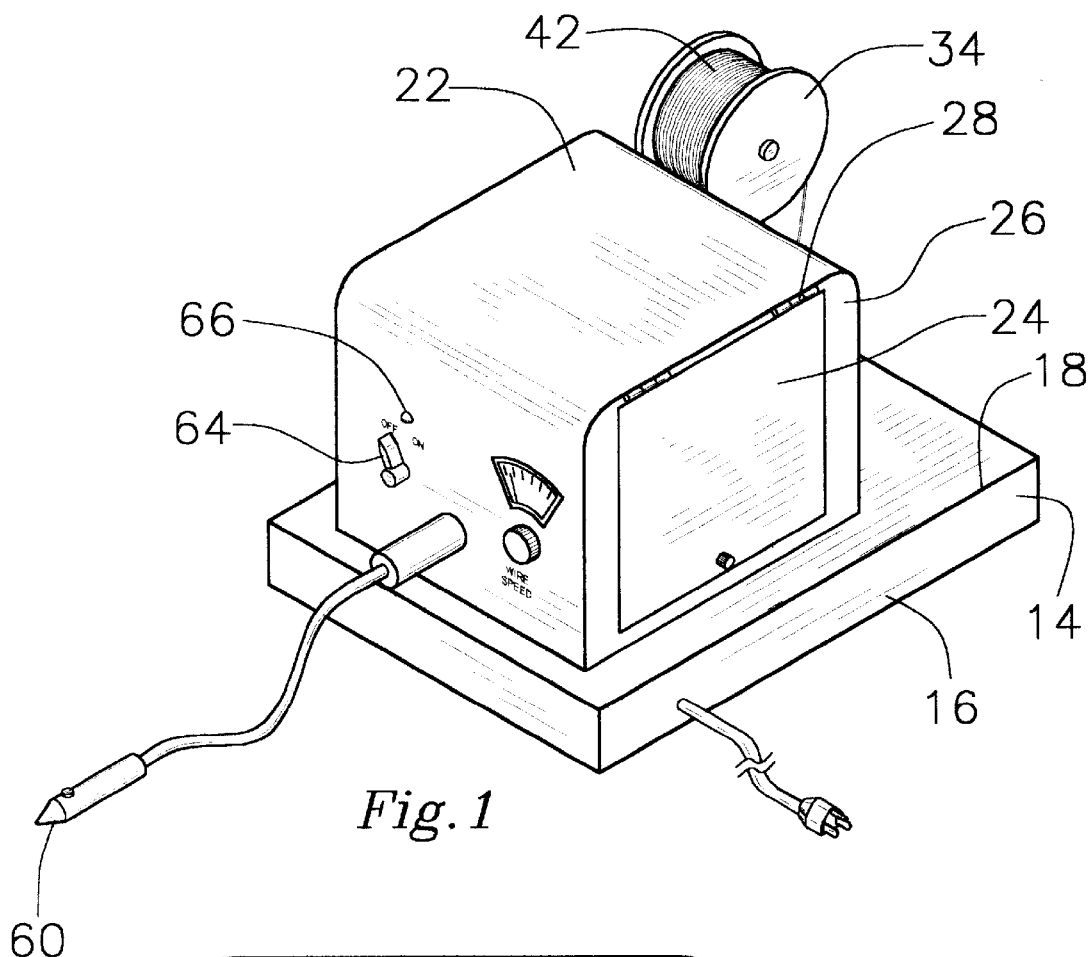
FIG. 1 is a perspective illustration of the preferred embodiment of the wire feed unit system to automatically feed fuller wire to a weld constructed in accordance with the principles of the present invention.
Figure 2:
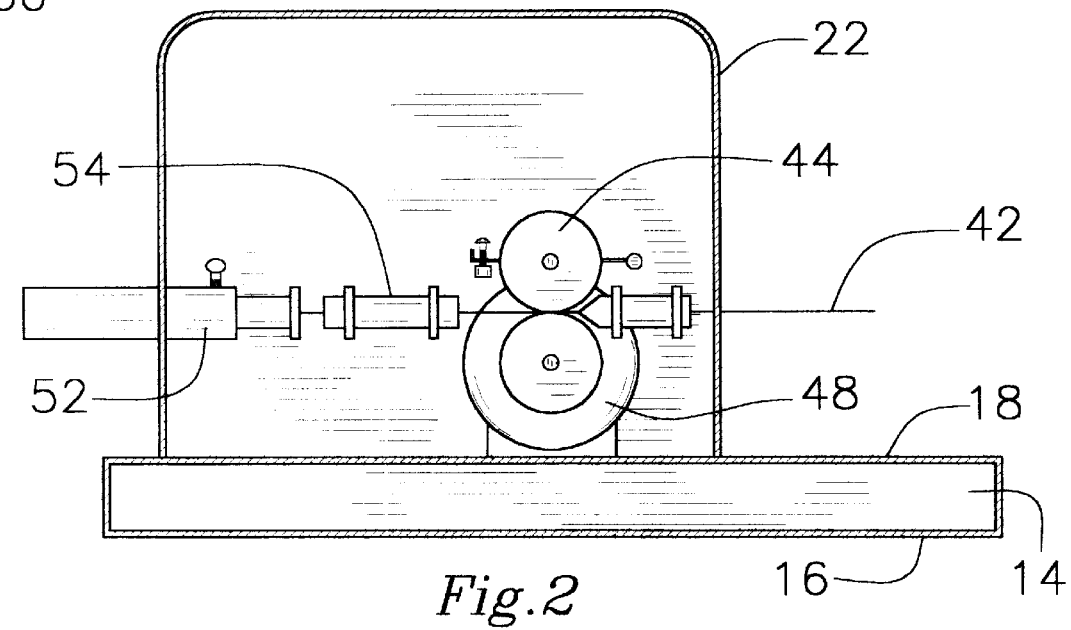
FIG. 2 is a side elevational view of the system shown in FIG. 1 with one of the side panels removed to show certain internal constructions thereof.

With reference now to the drawings, the preferred embodiment of the new and improved wire feed unit system to automatically feed fuller wire to a weld embodying the principles and concepts of the present invention and generally designated by the reference numeral 10 will be described.

The present invention, the new and improved wire feed unit system to automatically feed fuller wire to a weld is a system 10 comprised of a plurality of components. Such components, in their broadest context, include a base, a housing and wire feed wheels. Each of the individual components is specifically configured and correlated one with respect to the other so as to attain the desired objectives.

As described hereinabove, the new and improved wire feed unit system 10 to automatically feed filler wire to a weld comprises, in combination, a base 14 in a generally rectilinear configuration having a lower support surface 16 positionable upon a recipient surface and an upper support surface 18.

Also provided is a housing 22 formed in a generally rectilinear configuration located on the upper support surface with a door 24 mounted on one side face 26 thereof supported by a hinge 28 to allow access to an interior chamber therein.

Additionally provided is a spool supporting rod 32 positioned on the upper support surface upstream from the housing with a spool 34 rotatably supported thereon. The support rod has a pivotally mounted arm 36 with a pulley 38 at its outboard end and a tension spring 40 urging the arm and pulley downwardly with filler wire 42 mounted on the spool for movement around the pulley through the housing.

A pair of wire feed wheels 44, 46 are provided in rotatable driving contact with each other and an associated motor 48 for effecting the rotation of one of the wheels with the filler wire therebetween to thereby feed the filler wire from the pulley to exterior of the housing.

A whip hold down tube 52 extends through the housing at the downstream end thereof with an intermediate tubular wire guide 54 between the wheels and the whip hold down.

A flexible cylindrical line 58 extends from the whip hold down to the area to be welded with a cylindrical whip body at the end of the line. The whip body has a cone-shaped tip 60 at its end remote from the housing for positioning at the weld.

Controls include an off/on switch 64 with an indicator light 66 for actuating the motor to feed the filler wire and an associated feed dial to vary the wire speed.

As described hereinabove, the present invention will automatically feed filler wire in the weld, thus eliminating the need to stop to fed filler wire by hand.

The filler wire is on a spool which is attached to the back of the housing body unit. The housing unit could be produced out of aluminum, steel, or plastic and measures approximately 10" long by 8–10" wide, sitting on a 10 gauge to ¼" steel formed base measuring approximately 14"–16" wide in length and 12" in width and 2" in depth. The filler wire spool is attached to an 8" high extension bar that allows the spool to rotate. A speed dial is located on the front of the housing unit above the whip length sleeve. The whip body with an on/off trigger should not exceed ¾" in diameter. The trigger is a flat button, while the whip body has a tapered tip.

The interior of the housing unit contains a 110 volt, 60 hertz, 1750 rpm, 7 amp motor that is connected to the wire feed wheels and pulley system. Gears or a direct drive system cold also be utilized in place of the pulley system. The filler wire is inserted through two wire guide tubes. The wire guides have a pivot pin located at the back and a tightening screw and tension spring on the front. A whip hold-down block is directly in front of the second wire guide tube. The whip consists of a wire co-axle liner, soft plastic liner guide tube, a dual wire cable for the trigger voltage, and an outer rubber guard for protecting the wire and the electrical wires.

The system as described hereinabove has many features, including ease of use and the automatic feed of wires when trigger is depressed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved wire feed unit system to automatically feed filler wire to a weld comprising, in combination:

a base in a generally rectilinear configuration having a lower support surface positionable upon a recipient surface and an upper support surface;

a housing formed in a generally rectilinear configuration located on the upper support surface with a door mounted on one side face thereof supported by a hinge to allow access to an interior chamber therein, the housing having a wire input aperture and a wire output aperture;

a spool;

a spool supporting rod positioned on the upper support surface upstream from the housing with a spool rotatably supported thereon, the support rod having a pivotally mounted arm with a pulley at its outboard end and a tension spring urging the arm and pulley downwardly in an arcuate path with wire mounted on the spool for movement around the wire pulley into and through the housing from a generally downward direction to a generally horizontal direction;

a pair of wire feed wheels in rotatable driving contact with each other and an associated motor for effecting the rotation of one of the wheels with filler wire therebetween to thereby feed the filler wire from the pulley to exterior of the housing;

a cylindrical whip hold down tube extending through the wire output aperture of the housing at the downstream end thereof with an intermediate cylindrical tubular wire guide in axial alignment with the whip hold down tube and located between the wheels and the whip hold down tube;

a flexible cylindrical line extending from the whip hold down tube to the area to be welded with a cylindrical whip body at the end of the line, the whip body having a cone-shaped tip at its end remote from the housing for positioning at the weld; and controls including an off/on switch with an indicator light for actuating the motor to feed the filler wire and an associated feed dial to vary the wire speed.

\* \* \* \* \*